UNITED STATES PATENT OFFICE.

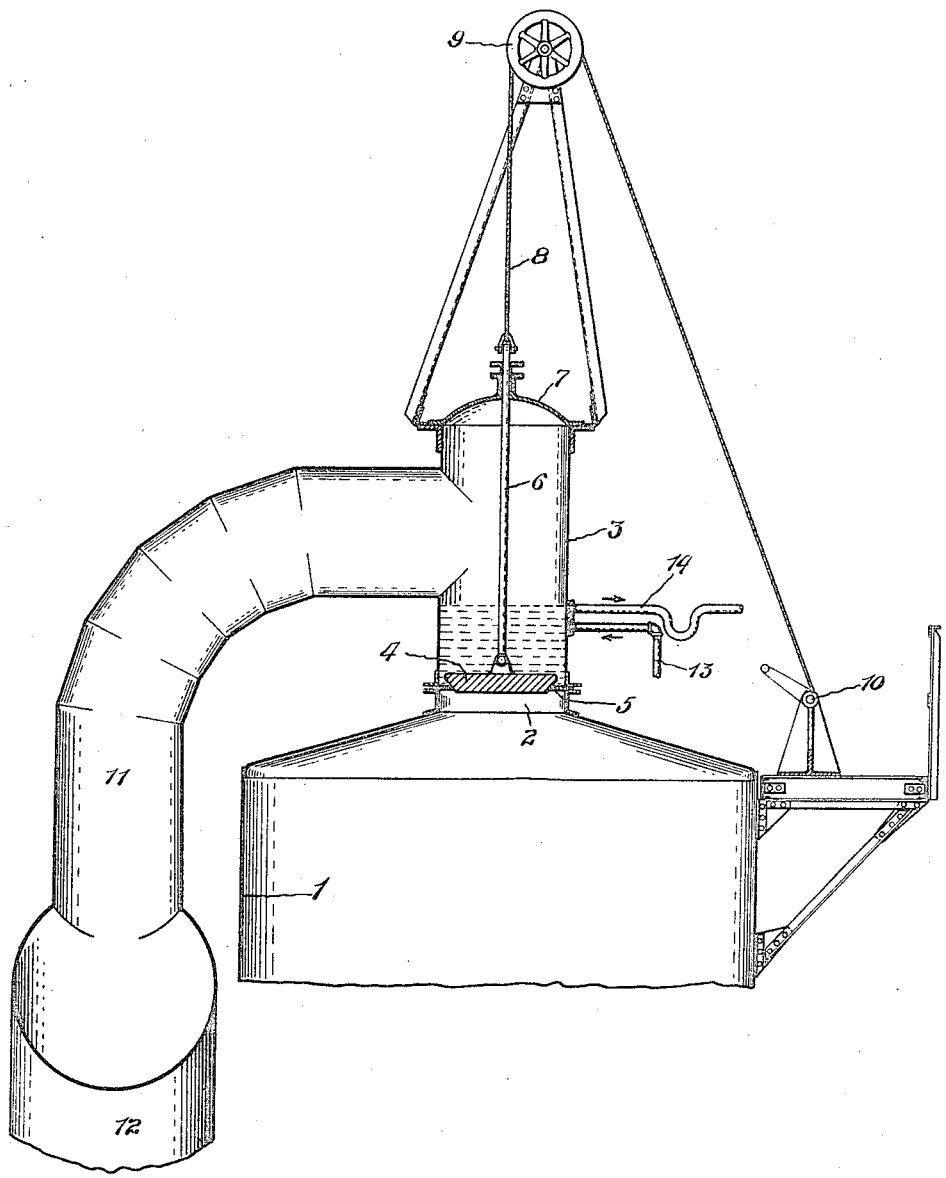

ARTHUR G. McKEE, OF CLEVELAND, OHIO.

WATER-SEALED VALVE.

1,266,509.  Specification of Letters Patent.  Patented May 14, 1918.

Application filed December 15, 1915, Serial No. 67,041. Renewed February 13, 1918. Serial No. 216,943.

*To all whom it may concern:*

Be it known that I, ARTHUR G. McKEE, a citizen of the United States, resident of Cleveland, county of Cuyahoga, and State of Ohio, have invented a new and useful Improvement in Water-Sealed Valves, of which the following is a specification, the principle of the invention being herein explained and the best mode in which I have contemplated applying that principle, so as to distinguish it from other inventions.

My invention relates to gas valves, and particularly to valves of comparatively large diameter and which are used with hot gases or under other circumstances which tend to warp or otherwise act upon the valve in a manner to cause leakage.

The object of the invention is to provide means for absolutely preventing leakage through such valves under certain conditions, as for instance, when it is necessary to send workmen into the interior of receptacles for repairs, where such receptacles are connected with a gas supply and such connection is controlled by one or more of such valves.

Heretofore such leakage has been prevented by constantly keeping the valve and seat in repair or renewing one or both of same. On account of the size, however, of the valves and seats, and the interruption in the service incident to changing these parts, such keeping in repair has been a very expensive operation. Collaterally, therefor, another object of my invention is to prevent such leakage in a simple and economical manner.

A further object of the invention is to provide means whereby the question of whether or not any gas is flowing past the valve may be readily, and with absolute certainty, visibly determined.

The said invention consists of means hereinafter fully described and particularly set forth in the claims, together with a method of sealing a valve, the disclosed means, however, constituting but one of various mechanical forms in which the principle of the invention may be applied.

In the annexed drawing, the figure represents an axial fragmentary section of one of a battery of gas washers used in connection with blast furnace practice, to which my invention has been applied.

The illustrated structure comprises a gas washer 1 of the well-known construction which is provided with an opening 2 at the top communicating with a gas duct 3, such communication being controlled by an ordinary vertically operating valve 4 and valve-seat 5, the valve-stem 6 passing up through a dome 7 and being connected by means of a rope or chain 8 passing over a pulley 9 with a windlass 10 as is common practice. An outlet pipe 11 communicates with the duct 3. This outlet pipe 11 is connected with a main outlet duct 12 with which the outlet pipes of the other gas washers communicate, as is well-known to those skilled in the art.

When all the washers are in operation, the gas flows into same from the bottom upwardly through the openings 2, past the valves 4 (all of which are raised during this operation) out of the pipes 11 and into the main outlet duct 12 from whence it passes to other parts of the apparatus as in this instance, to the gas drier (not shown).

Should it be desired to make any repairs in the apparatus as above described, which would necessitate the entrance into the interior of the washer of one or more workmen, the valve 4 would be closed and a similar valve (not shown) controlling the inlet of gas into the washer would also be closed, as will be readily understood. A manhole is then opened at the top and bottom and the residual gas thus permitted to escape from the washer. The safety of the workmen who would thereupon enter the interior, would depend upon the non-leakage of the two valves mentioned, inasmuch as there is a gas pressure above the valve 4 by reason of the connection of the outlet pipe 11 with the common or main outlet duct 12 which communicates with the other gas washers which are in operation. There is also a pressure, of course, behind the inlet valve which controls the connection with the bottom of the washer with the source of supply of gas, as will also be readily understood by those skilled in the art.

No readily visible means therefore were supplied to indicate with certainty what the condition of the contact between the valves and their respective seats was, and the lives of such workmen were often put in jeopardy on this account.

To obviate any possible danger such as has just been described and due to leakage, I provide both valves with a water-seal, such provision being made in the same manner in the case of both inlet and outlet although but one of same (the outlet valve) is illustrated as so provided.

In making this seal, I connect the interior of the duct 3 at a suitable point above the valve 4 with a controllable water-supply pipe 13 by means of which water may be discharged when desired into the duct and above the valve, and retained, when the latter is closed, as shown in the drawing. A short distance above the point of entrance of the water into the duct, I provide an outlet connected with a discharge pipe 14 and the end of this discharge pipe is carried a suitable distance outwardly to a point where it can be readily seen by an observer stationed upon the outside of the washer.

When it is desired to seal the valve and thus prevent any passage of gas past it and its seat, the valve is first lowered upon the latter to make its normal closure. The water is then turned into the pipe 13 and is discharged therethrough into the duct 3. As this discharge progresses, the water rises in the duct until it reaches the outlet and is discharged through the pipe 14. The rate of water-supply is made such that a continuous discharge of water from the outlet pipe 14 is effected.

It will therefore be seen that as long as water is being discharged from the pipe 14, the observer knows with certainty that there is absolutely no leakage of gas past the valve 4.

The same arrangement is provided in connection with the inlet valves (not shown) and its outlet pipe 14 is arranged to bring its end within the vision of the same observer. Thus it will be noted that the latter can observe the condition of both water seals simultaneously.

As a result the observer is enabled to determine with certainty the condition of both inlet and outlet seals and to therefore know with absolute certainty that no gas is leaking. In case the water should cease flowing from the outlet, the observer warns the workmen and the latter may emerge from the interior so as to run no risk whatsoever.

Under these conditions, therefore, such workman can before entering, determine for himself that the valves are sealed and unhesitatingly will enter the gas washer when such observer is stationed without to give due warning. He thus undertakes and completes any repairs with absolute security, and a realization thereof.

When the valve and seat permit of leakage, the water from the seal will flow through and into the receptacle, so that a rate of water supply must be adopted, greater than the rate of leakage, as will be apparent. After the required repairs are made and the apparatus again put into operation, the raising of the valve permits the water which has been forming the seal during the repairing operation, to discharge downwardly through the valve opening so that when this valve is again repaired, an additional supply of water is permitted to flow into the duct above the valve and again form a seal as before, the water being supplied so as to again overflow in order to indicate the presence of such seal.

Having fully described my invention, what I claim and desire to secure by Letters Patent is:—

1. In a valve structure, the combination of a valve and seat therefor; means for operating said valve; and means for forming a water seal for said valve when closed, said water being completely discharged to destroy the seal when the valve is opened.

2. In a valve structure, the combination of a valve and seat therefor, said valve being adapted to close the opening formed by said seat by contact; means for forming a water seal for such valve when closed; and means for permitting the water from such seal to be discharged, said seal being destroyed when the valve is out of contact with its seat.

3. In a valve structure, the combination of a valve and seat therefor, said valve adapted to engage said seat by contact and thereby close the valve opening formed by the seat; means for forming a water seal for such valve; and means for discharging water from said seal at a point laterally placed with reference thereto and readily visible from the exterior of the apparatus of which the valve forms a part, the valve and seat being of a structure such that when the valve is opened the water forming the seal will be discharged.

4. In a valve structure, the combination of a valve and seat therefor, said valve adapted to engage said seat by contact to close the opening formed thereby; means for forming a water seal for such valve when closed; means for continuously supplying water to such seal; and means for permitting a continuous visible discharge of water from said seal; said valve and seat being arranged with reference to said seal so that the latter is destroyed when the valve is opened.

5. In a valve structure, the combination with a valve and seat therefor; of a water seal connected with a controllable water supply and provided with an opening from which water from said seal may be discharged; said valve adapted, when open, to destroy said seal.

6. In a valve structure, the combination of a valve and seat therefor; of a water seal connected with a controllable water supply and provided with means from which the water from such seal may be visibly discharged; said valve forming the bottom of said seal.

7. In a valve structure, the combination of a gas duct; a vertically operating valve and horizontal seat therefor controlling the flow of gas through said duct; a water-supply pipe communicating with the interior of said duct and above said valve; and a water-outlet in said duct and located above said valve, said valve being so arranged that when the valve is open the water will be discharged from the valve opening.

8. In a valve structure, the combination of a gas duct; a vertically operating valve with a horizontal seat therefor controlling the flow of gas through said duct; a water-supply pipe communicating with the interior of said duct and above said valve and a water outlet in said duct and located above said valve; said duct, valve and valve seat forming the walls of a water seal and arranged so that the valve seat, when the valve is open, forms an outlet for the water of such seal.

9. The method of manipulating an apparatus including a valve and a valve seat and a chamber within which the contacting surfaces of said valve and seat are contained, which consists in continuously introducing water into said chamber when the valve is closed; permitting a continuous visible discharge of water therefrom; and then completely discharging the water by opening the valve.

10. The method of manipulating an apparatus including a valve and a valve seat, which consists in covering the adjacent parts of the valve and seat when closed, with water to form a seal; supplying additional water; permitting a visible discharge of water from such seal; and then discharging the water completely from said seal.

11. The method of manipulating an apparatus including a valve and valve seat, which consists in covering the adjacent parts of the valve and seat when closed, with water to form a seal; supplying additional water; permitting a visible discharge of water from such seal; and then destroying such seal by opening the valve and completely discharging the water from said seal.

Signed by me this 13th day of December, 1915.

ARTHUR G. McKEE.

Copies of this patent may be obtained for five cents each, by addressing the "Commissioner of Patents, Washington, D. C."